July 21, 1942.　　　　D. M. SMITH　　　　2,290,499
PISTON RING
Filed Feb. 16, 1940

INVENTOR:
Dallas M. Smith

Patented July 21, 1942

2,290,499

UNITED STATES PATENT OFFICE 2,290,499

PISTON RING

Dallas M. Smith, Kirkwood, Mo., assignor to Mc-Quay-Norris Manufacturing Company, St. Louis, Mo., a corporation of Delaware Application February 16, 1940, Serial No. 319,280

3 Claims. (Cl. 309—45)

My invention relates to piston rings and more particularly to piston rings of the type used in internal combustion engines of modern design wherein to effect greatest economy in oil consumption and to prevent loss of compression in the cylinder head it is often desirable to use an oil ring having a cylinder contact greatly reduced from the axial width of the ring so that the cylinder engaging portion of the ring will have a comparatively high radial pressure per unit of area for a given ring load.

In the past it has been found efficacious to use an oil ring comprising a plurality of independently expansible steel wafer rings separated or otherwise maintained in predetermined position axially of the piston ring groove by one or more spacer rings. Such a packing assembly has given good results under certain conditions but in some instances it is desirable to use a one piece piston ring.

With these and other problems in mind the objects of my invention are to provide a piston ring for the control of oil in an internal combustion engine which ring will be of one piece construction and will present a pair of narrow circumscribing ribs for engagement by the cylinder wall; to provide a piston ring which may be formed of steel; to provide a piston ring which will allow free drainage through the ring of oil scraped from the cylinder wall; and to provide a piston ring which will be cheap to manufacture, easy to install and efficacious in operation.

Figure 1:
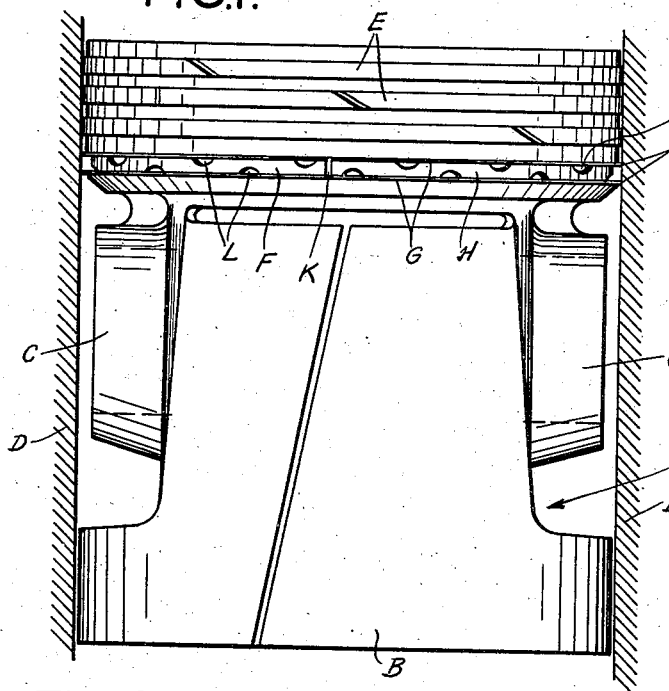
Figure 3:
Figure 2:
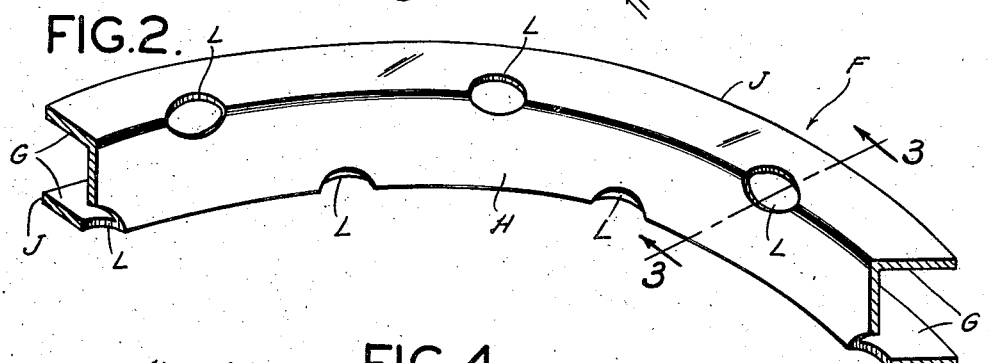

In the accompanying drawing, wherein similar characters are used to designate similar parts, I have shown one form of ring embodying my invention. In the drawing, Fig. 1 is a view of a piston on which my new and improved piston ring has been mounted; Fig. 2 is a segment of the ring removed from the piston ring groove; Fig. 3 is a sectional view along the lines 3—3 of Fig. 2, and Fig. 4 is an enlarged view showing somewhat diagrammatically the way a piston ring embodying my invention, in its preferred form, fits within the ring groove of the piston, shown in Fig. 1.

Referring to the figures, the piston A on which is mounted the present embodiment of my invention has the usual skirt B, carrying pin bosses C and is provided with four piston ring grooves in the head thereof. The wall of the cylinder in which the piston reciprocates is diagrammatically shown at D. In Fig. 1, the three uppermost ring grooves contain compression rings E of the ordinary, split, one piece type but the lowermost groove, as shown, contains an oil ring F made according to my new and improved design.

This oil ring F comprises a U-shaped channel member, preferably of steel, formed into a resilient split ring with the side portions G extending radially outwardly from the base portion H so that the free edges J of the side portions form a pair of spaced, circumferentially disposed cylinder engaging portions.

Figure 4:
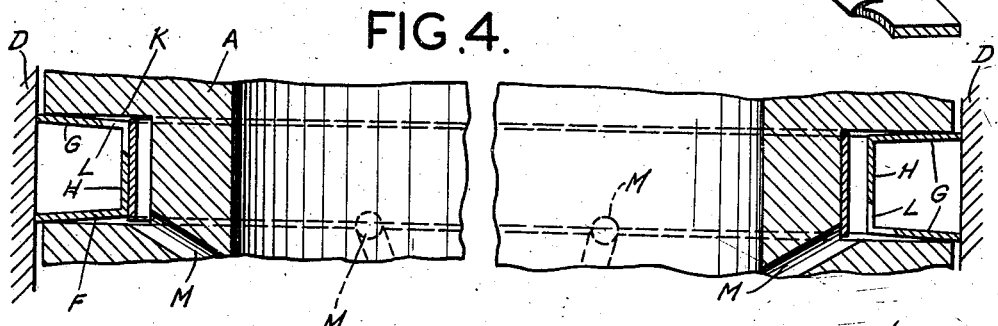

I prefer that the side portions G be arranged substantially at right angles to the base portion but if the side portions diverge outwardly from their base towards the free edges thereof, when the piston ring is contracted in the piston ring groove K having a greater axial width than the width of the base portion H, the outer corners of the ring groove will make annular, substantially line contacts with the side portions of the ring, as shown fully in Fig. 4, and best results will be obtained, particularly where my new piston ring is installed in old motors, wherein the piston ring grooves have become worn in use.

Any oil ring must be vented so that oil removed from the cylinder wall may flow through the ring into the ring groove from where it may be drained to the hollow interior of the piston. My invention contemplates provision for this oil flow by providing openings L, preferably, arranged in series at the line of integral connection between the base portion and each side portion so that a part of each opening extends through the base portion and a part extends through a side portion, all as shown. If the openings are arranged in series, positioned as just described, in addition to forming oil passages through the ring they will relieve fiber stress created in the material during the forming and bending operations and distortion of the ring, because of such fiber stresses, will be obviated. The usual ports M may be provided to lead from the bottom of the ring groove K to the hollow interior of the piston B so that oil passing through the passages L into the piston ring groove may find its way back to the crank case of the engine.

In some instances it may be desirable to provide a piston expander of any well known type behind the piston ring F and in such event, of course, the expander will be positioned between the inner face of the base portion H and the bottom of the ring groove K, as shown in Fig. 4.

It will be evident that my new and improved piston ring will accomplish the objects of the invention as hereinabove set forth. Also, it will be evident to one skilled in the art, that my piston ring when used on a piston of an internal combustion engine will operate effectively and effectually to provide a seal between the piston and the cylinder wall and between the sides of the piston ring groove and the piston ring.

I do not intend to limit myself to the exact details of construction shown in the drawing since the proportions of the channel member comprising the ring, the thickness of the metal used and, particularly, the shape, size, and arrangement of the vents L, may be varied within wide limitations without departing from the ambit of the appended claims.

What I claim as new and desire to secure by Letters Patent is:

1. A piston ring for use in the ring groove of a piston and comprising a steel U-shaped channel member formed into a resilient split ring with the side portions of said channel diverging outwardly from their base toward their free edges, said ring being formed and arranged so that when said piston ring is contracted in a piston ring groove of greater axial width than the width of the base portion of said channel member the outer corners of said ring groove will make annular, substantially line contacts with the side portions of said channel member.

2. A piston ring comprising a U-shaped channel member formed into a resilient split ring, said channel member comprising a base portion and side portions diverging outwardly from said base portion toward their free edges and forming a pair of spaced circumferentially disposed cylinder engaging portions, said ring being formed and arranged so that when said piston ring is contracted in a piston ring groove of greater axial width than the width of said base portion the outer corners of said ring groove will make annular, substantially line contacts with said side portions, and said channel member at the line of integral connection between said base portion and each of said side portions having a series of spaced openings extending therethrough, each of said openings being arranged and positioned so that a part thereof extends through said base portion and a part extends through said side portion.

3. A piston ring for use in the ring groove of a piston and comprising a steel U-shaped channel member formed of material of uniform thickness into a resilient split ring with the side portions of said channel diverging outwardly from their base toward their free edges, the cylinder contacting face of said ring being substantially as wide as the remainder thereof, said ring being formed and arranged so that when said piston ring is contracted in a piston ring groove of greater axial width than the width of the base portion of said channel member, the outer corners of said ring groove will make annular substantially line contacts with the side portions of said channel member.

DALLAS M. SMITH.